United States Patent
Sanjeev

(10) Patent No.: US 8,849,951 B2
(45) Date of Patent: Sep. 30, 2014

(54) GENERATING CUSTOM ADDRESS LINKS

(75) Inventor: Kumar Sanjeev, San Ramon, CA (US)

(73) Assignee: Cellco Partnership, Basking Ridge, NJ (US)

( * ) Notice: Subject to any disclaimer, the term of this patent is extended or adjusted under 35 U.S.C. 154(b) by 158 days.

(21) Appl. No.: 13/466,545

(22) Filed: May 8, 2012

(65) Prior Publication Data

US 2013/0304845 A1 Nov. 14, 2013

(51) Int. Cl.
*G06F 15/16* (2006.01)

(52) U.S. Cl.
USPC .......................................................... 709/217

(58) Field of Classification Search
CPC .............................. H04L 67/18; H04L 67/02
USPC ................... 709/217, 245, 204, 205
See application file for complete search history.

(56) References Cited

U.S. PATENT DOCUMENTS

| | | | |
|---|---|---|---|
| 2007/0030824 A1* | 2/2007 | Ribaudo et al. | 370/328 |
| 2007/0226004 A1* | 9/2007 | Harrison | 705/1 |
| 2008/0052372 A1* | 2/2008 | Weber et al. | 709/217 |
| 2008/0256486 A1* | 10/2008 | Hagiwara | 715/810 |
| 2009/0029674 A1* | 1/2009 | Brezina et al. | 455/405 |
| 2009/0325603 A1* | 12/2009 | Van Os et al. | 455/456.2 |
| 2010/0146132 A1* | 6/2010 | Morris | 709/229 |
| 2010/0261485 A1* | 10/2010 | Fernandes | 455/456.3 |
| 2011/0319060 A1* | 12/2011 | Gentemann | 455/414.1 |

FOREIGN PATENT DOCUMENTS

| | | |
|---|---|---|
| JP | 2007213128 A * | 8/2007 |
| WO | WO 2010030475 A8 * | 4/2011 |

OTHER PUBLICATIONS

Google Maps, http://maps.google.com/ May 8, 2012, 2 pages.
No-IP—Dynamic DNS, Static DNS for Your Dynamic IP, http://www.no-ip.com May 8, 2012, 1 page.

* cited by examiner

*Primary Examiner* — Kostas Katsikis

(57) ABSTRACT

A system is configured to receive location information associated with a geographic location, determine a web address associated with the location information, and determine a custom address associated with the location information and the web address, where the custom address is descriptive of the location information and is different than the web address. The system is further configured to store information associating the web address, the custom address, and the location information, and send the custom address to a user device, where the user device is able to use the custom address to obtain or share at least a portion of the location information at the web address.

20 Claims, 12 Drawing Sheets

| | Location Name 510 | Location Address 520 | Longitude/Latitude 530 | Custom Information 540 | Custom Instructions 550 | Web Address 560 | Custom Address 570 |
|---|---|---|---|---|---|---|---|
| 1 | Golden Gate Bridge | 1405 Golden Gate Bridge Mill Valley, CA 94941 | 37.82065,-122.478526 | Great place to jog or bike ride!! | Display map with directions based on current location | http://maps.verizon.com/479090dh282789.ehshdh2/djssa-1405_Mill Valley_CA_94 941" | |
| | | | | | Display custom information | | http://address.of/goldengatebridge.com |
| 2 | Eiffel Tower | Avenue Pierre Loti 75007 Paris, France | 48.854014, 2.300735 | Eiffel_Tower.jpg | Open mapping software | http://maps.verizon.com/37dhe8sj27h/address.lookup.avenue_pierre_lot_75 007_paris_france | |
| | | | | | Display custom information and directions in mapping software | | http://address.of/eiffeltower.com |
| | Pizza places near Walnutt Creek, CA | Roundtable Pizza 1776 North Broadway, Walnut Creek, CA | 37.903777,-122.060466 | Amazing pepperoni! | Display map | | |
| 3 | | Skipoloni's Pizza 1535 Giammona Drive, Walnut Creek, CA | 37.90205,-122.06259 | Try their thin crust! | Display map | http://maps.verizon.com/43fgdf9/address.lookup.avenue_walnutt_creek_C A/query=pizza &$# | http://pizza_near/walnutt_creek_ca.com |
| | | Extreme Pizza 1630 Cypress Street, Walnut Creek, CA | 37.898715,-122.062762 | Best pizza in town! | Display map | | |
| | | | | | Display custom information | | |

GENERATING CUSTOM ADDRESS LINKS

BACKGROUND

Users often use user devices to obtain information about locations, such as location addresses, directions, traffic information, images, videos, or other content associated with the location. User devices may obtain location information from web pages over the World Wide Web ("web"). Web pages with location information may be accessed through web addresses, such as universal resource locator (URL) links.

BRIEF DESCRIPTION OF THE DRAWINGS

FIG. 5 illustrates an example data structure that may be stored in a custom location information page server;

DETAILED DESCRIPTION OF THE PREFERRED EMBODIMENTS

The following detailed description refers to the accompanying drawings. The same reference numbers in different drawings may identify the same or similar elements.

A system and/or method, as described herein, may simplify the process of identifying and/or sharing information associated with a geographic location (hereinafter referred to as a "location" or "locations"). For example, the system and/or method may receive and/or store information, associated with one or more locations, from a user device, a server (e.g., a map data server), and/or from any other device. In one implementation, the information associated with a location may include a location name, a physical address, longitude and latitude coordinates, a map of the location, street views of the location, traffic information associated with the location, and/or other information (e.g., custom narratives, reviews, images, videos, historical information, etc.), associated with the location. The system and/or method may determine a customized web address (hereinafter referred to as a "custom address"), associated with the location information. For example, the custom address may be a string of characters, such as "http://address.of/goldengatebridge.com." Additionally, or alternatively, the custom address may include a user defined address alias, a computer generated address alias, and/or some other alias associated with the location information.

The system and/or method may permit a user to share and/or select the custom address via a user device. The system and/or method may present the location information via the user device, based on detecting selection of a custom address. In some implementations, the detection of the selection of the custom address may correspond to the user selecting the custom address and/or the user device automatically selecting the custom address, based on embedded instructions within the custom address.

Figure 1A:
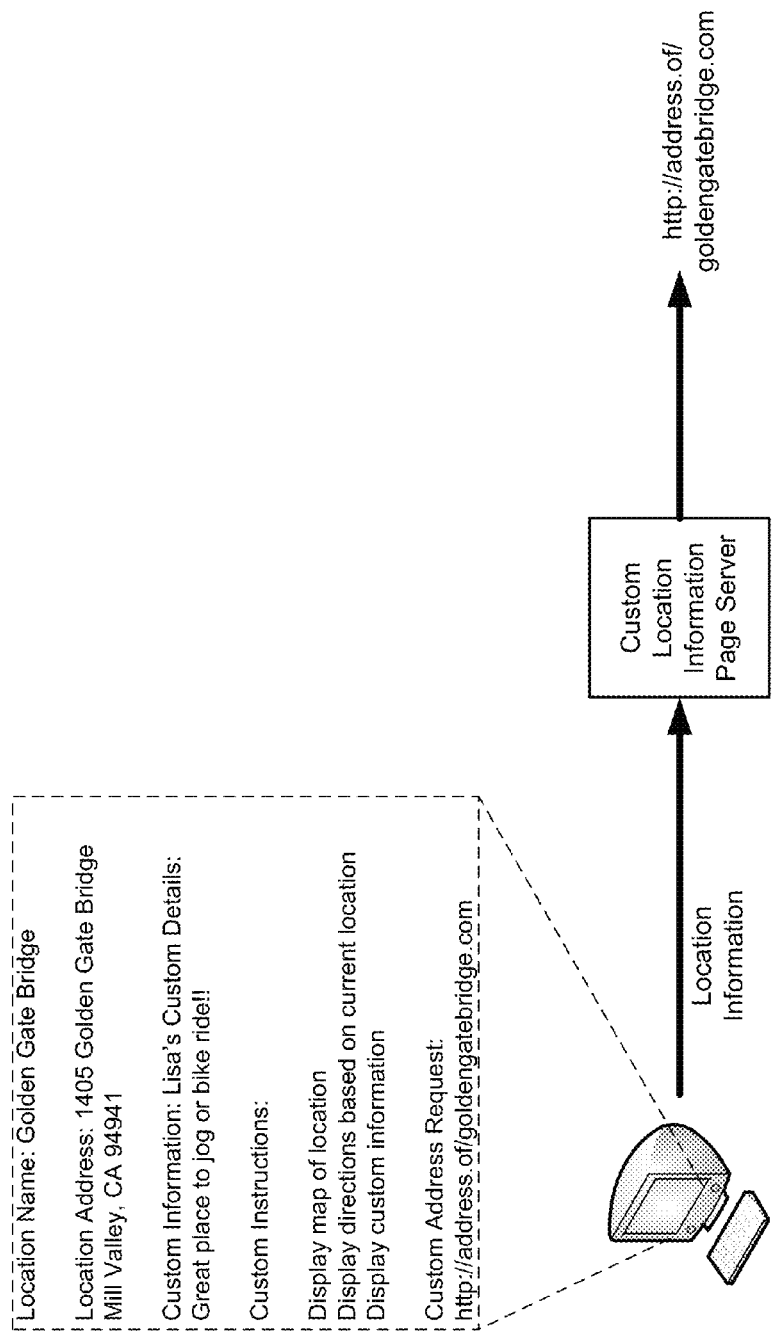
FIGS. 1A and 1B illustrate an example overview of an implementation described herein.
Figure 1B:
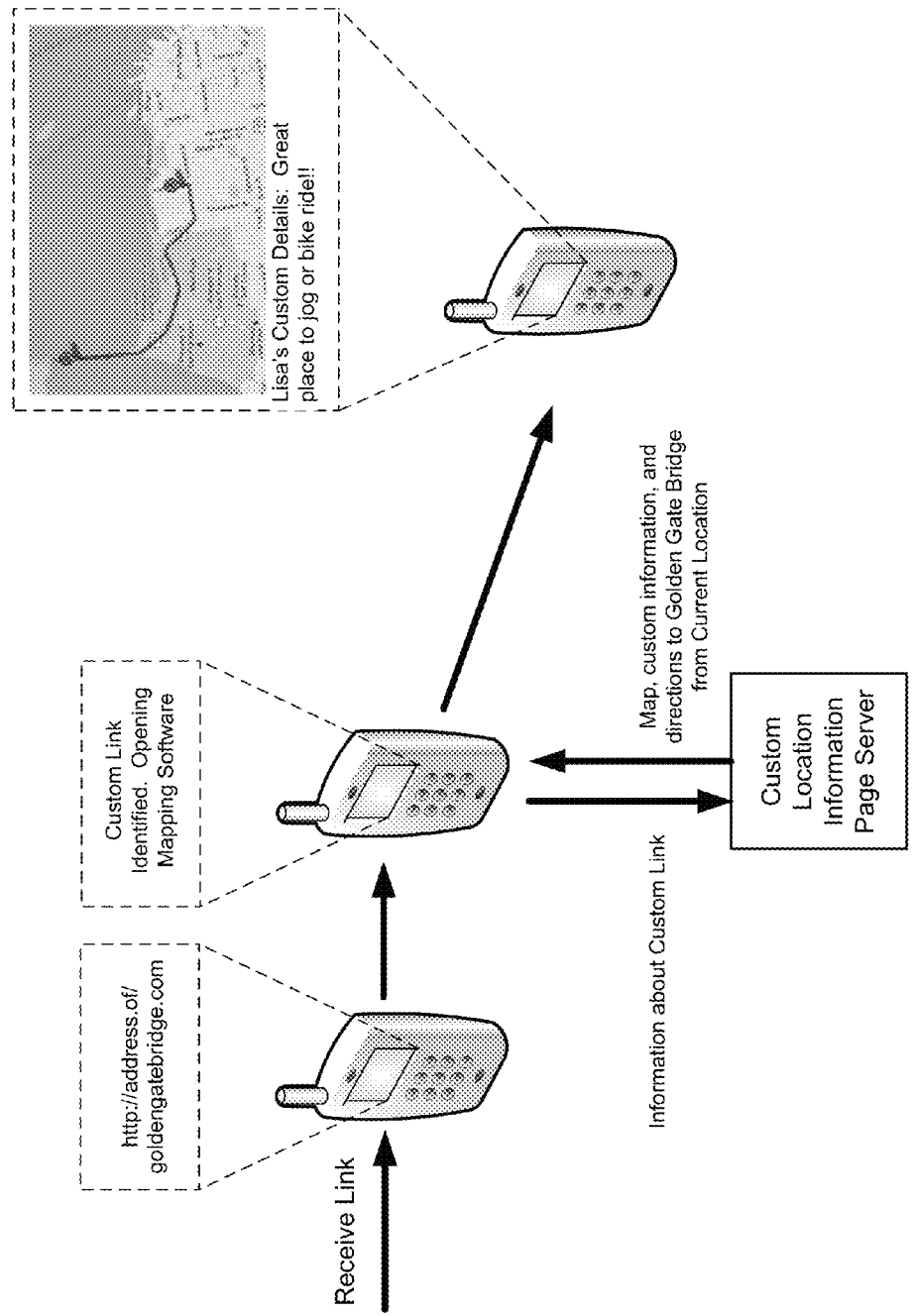

FIGS. 1A and 1B are diagrams of an example overview of an implementation described herein. As shown in FIG. 1A, a custom location information page server (hereinafter referred to as a "custom server") may receive and/or store information about a location, and may determine a custom address associated with the received location information.

In one implementation, the custom server may receive location information from a user device, and/or some other device, such as a map data server (hereinafter referred to as a "map server"). For example, as shown in FIG. 1A, a user may use a user device to input location information. The location information may be inputted into fields within a web page or uploaded via some other software. The location information may include a location name (e.g., "Golden Gate Bridge"), a location address (e.g., "1405 Golden Gate Bridge Mill Valley, Calif. 94941"), custom information (e.g., the narrative: "Lisa's Custom Details: Great place to jog or bike ride!!"), a custom address (e.g., "http://address.of/goldengatebridge.com"), and/or any other information associated with the location. Additionally, or alternatively, the custom server may automatically identify additional location information, based on the information provided by the user device.

The custom server may receive and/or store the location information from the user device and/or the map server, and determine a custom address (e.g., "http://address.of/goldengatebridge.com"), which may be descriptive of the location. In one implementation, the user may provide the custom server with the custom address. Additionally, or alternatively, the custom server may determine the custom address based on some other technique. Thus, the location information for a location (e.g., the Golden Gate Bridge) may be associated with a custom address (e.g., "http://address.of/goldengatebridge.com").

In one implementation, the custom server may output the custom address to a server (e.g., in the form of a web page), a user device, and/or some other device. The custom server may output the custom address to a user device via electronic mail (e-mail), short message service (SMS) text, or some other technique. In some implementations, a user associated with the user device, may share the custom address via e-mail, SMS text, social networking websites, and/or some other technique.

As shown in FIG. 1B, assume that a user device has received the custom address via any of the techniques discussed above. In some implementations, the user device may receive an instruction to select the custom address. The user device may query the custom server for location information associated with the custom address. The user device may present some or all of the received location information (e.g. the narrative "Lisa's Custom Details: Great place to jog or bike ride!!", and directions to the location from the current location of the user device). Additionally, or alternatively, the user device may request any information associated with the location (e.g., directions from a specified location, images, videos, etc.) The user device may present the location information via a standard web browser, via mapping software, and/or some other software. In some implementations, the mapping software and/or some other software may improve the way the location information is presented compared to how the location information may be presented in a web browser. Additionally, or alternatively, the user device may detect instructions embedded within the custom address or accompanying the location information. The instructions may cause the user device to automatically open mapping software and/or some other software to present the location information.

FIGS. 1A and 1B illustrate some examples for simplifying the process of identifying and/or sharing location information, based on a theoretically unlimited number of possible inputs, with respect to location information. In practice, a user may define any number of inputs to identify and/or share location information including, or in addition to, the inputs described above.

While systems and/or methods will be described in terms of location information and mapping software, the systems and/or methods are not so limited. For example, the systems and/or methods may store any information, and/or cause a user device to automatically open software, based on detecting selection of a custom address. In one implementation, the custom address may be associated with information about any subject including or excluding location information (e.g., information regarding historical figures, sports teams, medical research, etc). Additionally, or alternatively, the custom address may cause a user device to open audio/video software or some other software to present the information associated with the custom address.

Figure 2:
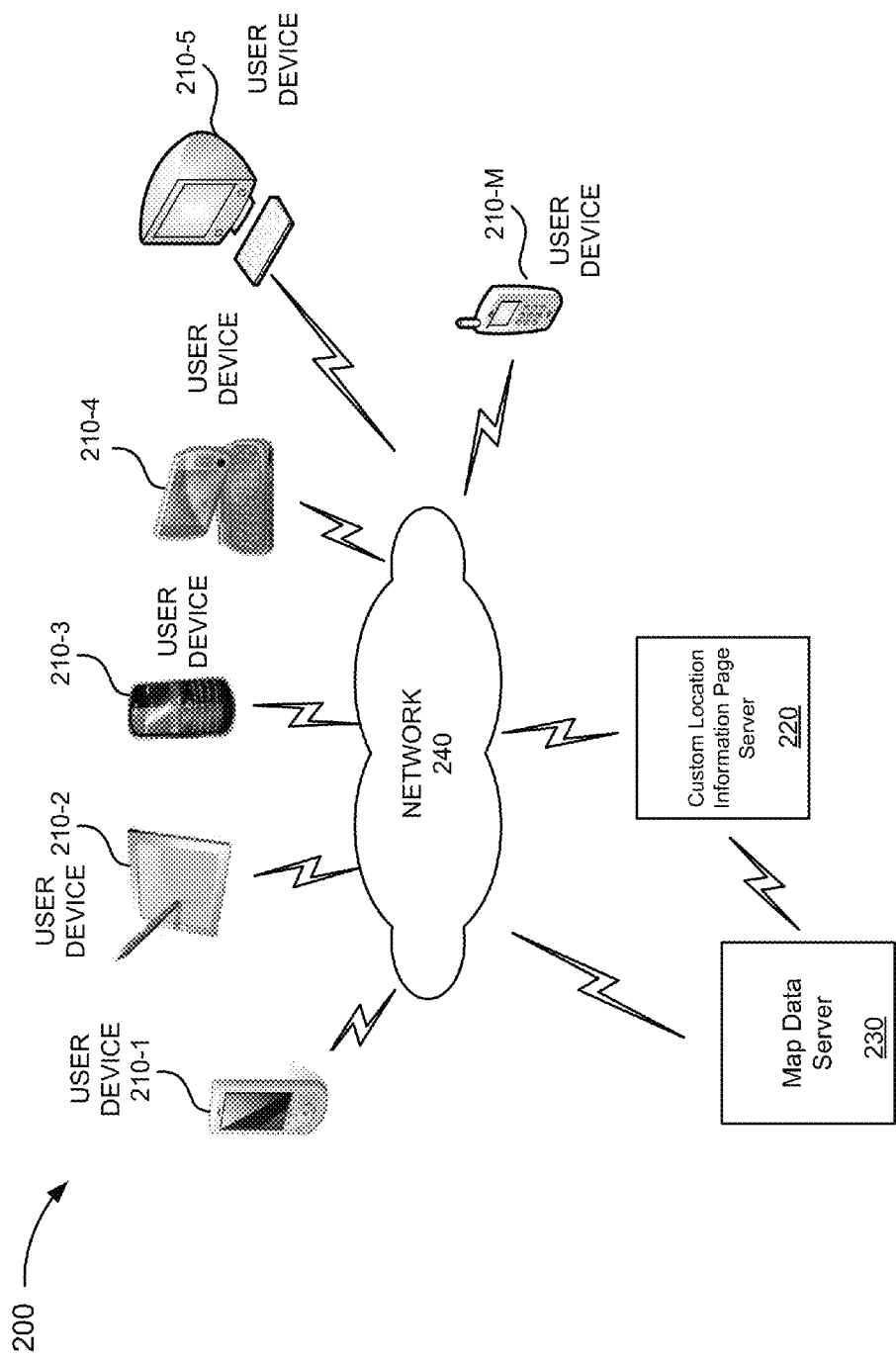
FIG. 2 illustrates an example environment in which systems and/or methods, described herein, may be implemented.

FIG. 2 illustrates an example environment 200 in which systems and/or methods, described herein, may be implemented. As shown in FIG. 2, environment 200 may include user devices 210-1 through 210-M (where M≥1) (collectively referred to as "user devices 210," and individually as "user device 210"), custom location information page server 220 (hereinafter referred to as "custom server 220"), map data server 230 (hereinafter referred to as "map server 230"), and network 240.

User device 210 may include any portable or non-portable device capable of communicating via a network. For example, user device 210 may correspond to a mobile communication device (e.g., a mobile phone or a personal digital assistant (PDA)), a portable computer device (e.g., a laptop or a tablet computer), or another type of portable device. User device 210 may also, or alternatively, include a client device such as a set top box for a television, a digital video recorder (DVR), a desktop computer or the like.

Custom server 220 may include a server device, such as a computing device. In some implementations, custom server 220 may receive and/or store information such as location name, location address, location longitude and latitude coordinates, custom address request, custom narratives, reviews, images, videos, other multimedia content, and/or some other information, associated with one or more locations. Custom server 220 may also generate custom addresses associated with one or more locations, output the custom addresses, and output the location information to user device 210.

Map server 230 may include a server device, such as a computing device. In some implementations, map server 230 may receive and/or store information, such as location name, location address, location longitude and latitude coordinates, user reviews, images, videos, other multimedia content, historical information concerning a location, traffic information, and/or some other information, associated with one or more locations. Map server 230 may identify additional location information, based on location information received from user device 210. For example, assume that map server 230 receives a location name (e.g., "Golden Gate Bridge"). Map server 230 may identify information associated with the location name, such as a location address, location longitude and latitude coordinates, user reviews, images, videos, other content, historical information concerning the location, traffic information, and/or some other information, associated with the location. In one implementation, the interactions between map server 230, custom server 220, and/or user device 210 may be performed using the hypertext transfer protocol (HTTP) or the secure HTTP (HTTPS). In one implementation, the interactions between map server 230, custom server 220, and/or user device 210 may be performed using another type of protocol.

Network 240 may include any type of network or a combination of networks. For example, network 240 may include a LAN, a wireless LAN (WLAN), a wide area network (WAN) (e.g., the Internet), a metropolitan area network (MAN), an ad hoc network, a telephone network (e.g., a Public Switched Telephone Network (PSTN), a cellular network, or a voice-over-IP (VoIP) network), or a combination of networks. Each of user device 210, custom server 220, and/or map server 230 may connect to network 240 via a wireless connection, a wired connection, or a combination thereof.

Figure 3:
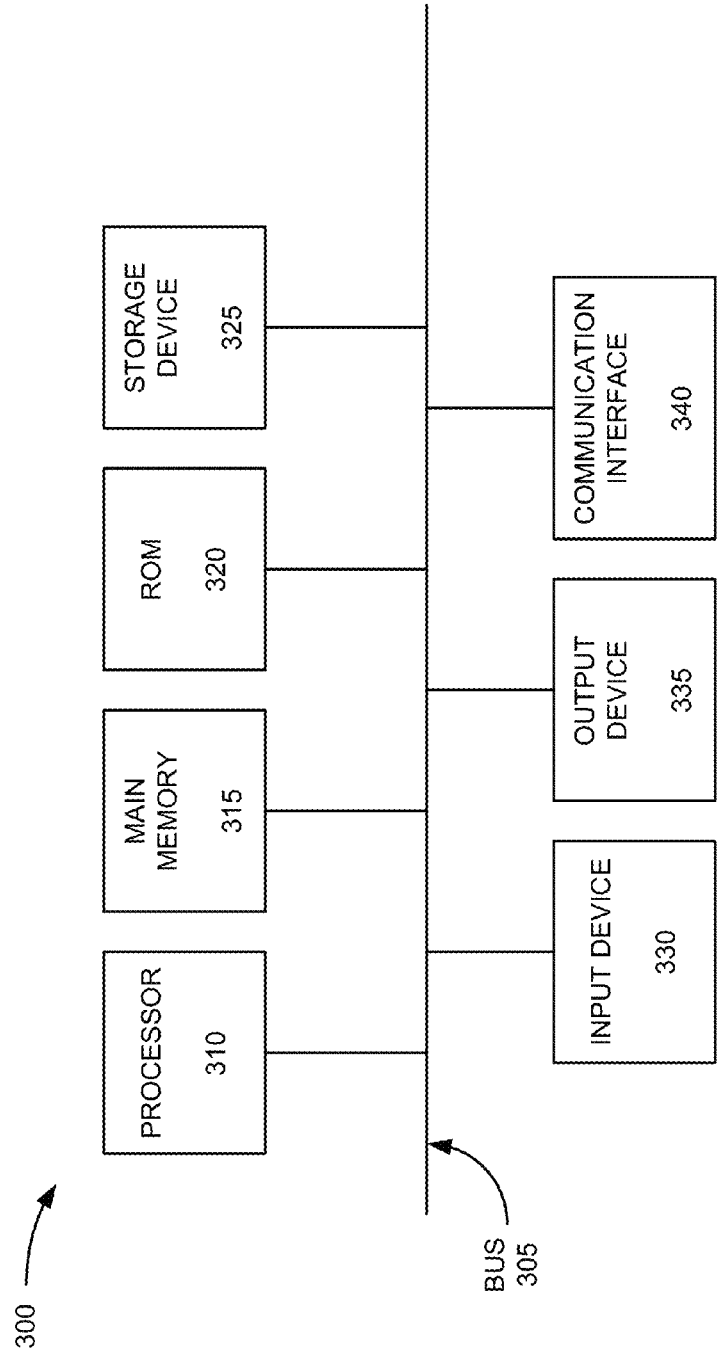
FIG. 3 illustrates example components of a device that may be used within the environment of FIG. 2.

FIG. 3 illustrates example components of a device 300 that may be used within the environment of FIG. 2. Device 300 may correspond to user device 210 and/or servers 220-230. Each of user device 210 and/or servers 220-230 may include one or more devices 300.

As shown in FIG. 3, device 300 may include a bus 305, a processor 310, a main memory 315, a read only memory (ROM) 320, a storage device 325 (also referred to as a local storage device or local storage), an input device 320, an output device 325, and a communication interface 330. In some implementations, device 300 may include additional components, fewer components, different components, or differently arranged components.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 320 may include a mechanism that permits an operator to input information to device 300, such as a control button, a keyboard, a keypad, or another type of input device. Output device 325 may include a mechanism that outputs information to the operator, such as a light emitting diode (LED), a display, or another type of output device. Communication interface 330 may include any transceiver-like mechanism that enables device 300 to communicate with other devices or networks. In one implementation, communication interface 330 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include space within a single physical memory device or spread across multiple physical memory devices.

The software instructions may be read into main memory 315 from another computer-readable medium, such as storage device 325, or from another device via communication interface 330. The software instructions contained in main memory 315 may cause processor 310 to perform processes that will be described later. Alternatively, hardwired circuitry may be used in place of or in combination with software instructions to implement processes described herein. Thus, implementations described herein are not limited to any specific combination of hardware circuitry and software.

Figure 4:
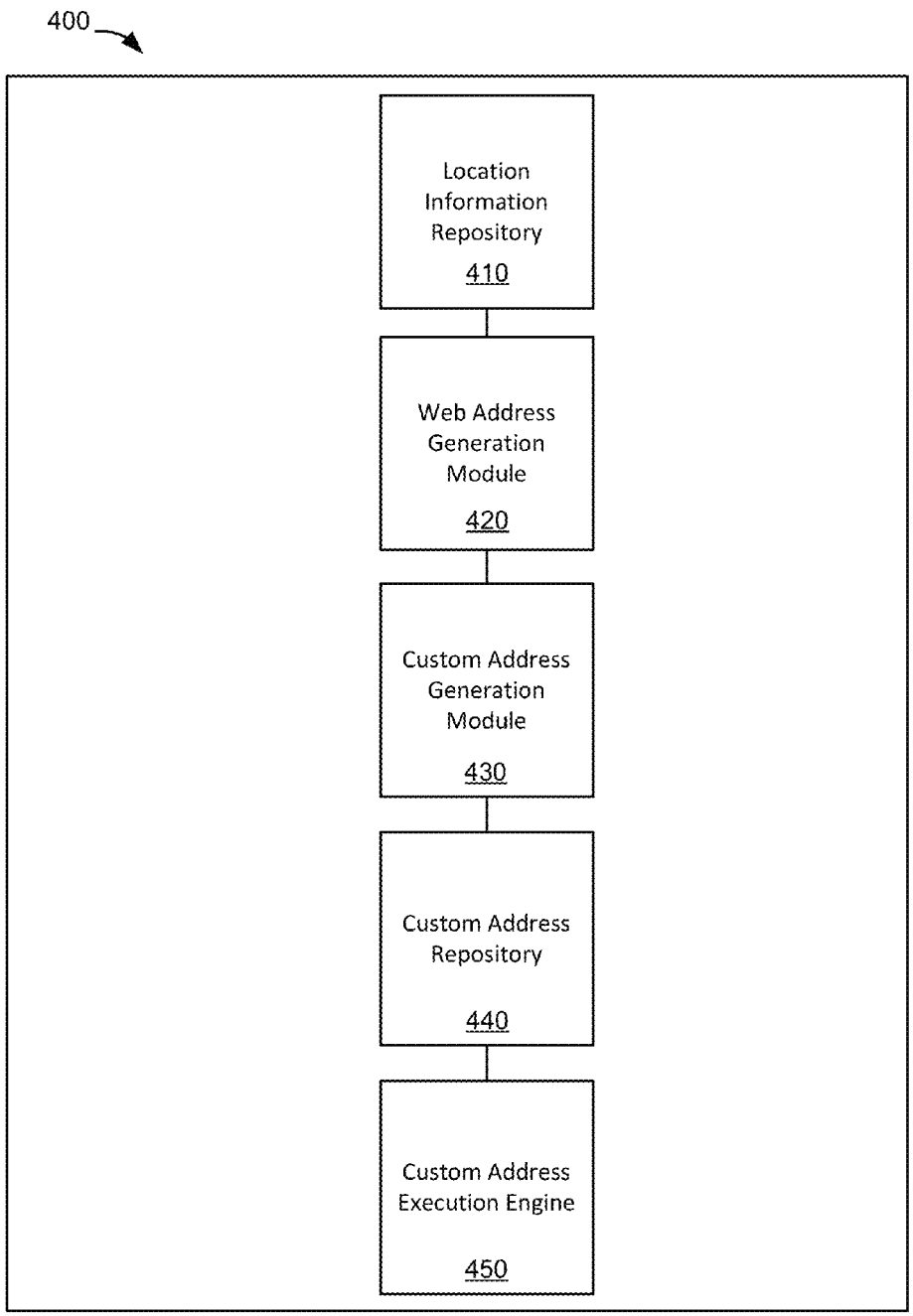
FIG. 4 illustrates example functional components of an example system.

FIG. 4 illustrates example functional components of an example system 400. System 400 may include functional components implemented by custom server 220. In another implementation, system 400 may include functional components implemented by one or more devices, which include or exclude custom server 220. For example, map server 230 may include some or all of the functional components of system 400.

As shown in FIG. 4, system 400 may include modules 410-450. In some implementations, system 400 may include fewer, additional, or different nodules. Any, or all, of modules 410-450 may be implemented by one or more memory devices (such as main memory 315) and/or one or more processors (such as processor 310). Furthermore, multiple modules may be associated with the same memory device and/or processor (e.g., one memory device, or one set of memory devices, may store information associated with two or more of modules 410-450).

Location information repository 410 may receive and/or store information associated with one or more locations. For example, location information repository 410 may store location information, such as location names, location addresses, longitude and latitude coordinates, historical information concerning a location, custom information (e.g., custom narratives, reviews, reports, images, videos, and/or other content) custom instructions, custom addresses, and/or any other information. The custom instructions may allow the user to define what location information is presented, and/or how location information is presented, on a user device, based on the user device selecting the custom address. For example, the custom instructions may include instructions that cause user device 210 to display location information associated with the custom address (e.g., a map of the location, custom information, comments, images, videos, and/or directions based on a current location of user device 210) via a map page and/or mapping software.

In one implementation, location information repository 410 may receive location information from user device 210 and/or map server 230. For example, a user may use user device 210 to provide location information to location information repository 410, as described above with respect to FIG. 1A.

Additionally, or alternatively, location information repository 410 may receive information from map server 230. For example, assume that the user uses user device 210 to provide location information about a location, such as the name of the location (e.g., "Golden Gate Bridge"). Map server 230 may receive the location information (i.e., "Golden Gate Bridge") from user device 210, and identify additional information associated with the location. For example, map server 230 may identify additional location information associated with the location, such as a street address, longitude and latitude coordinates, images, videos, traffic information, historical information, etc. In one implementation, location information repository 410 may receive the location information from map server 230.

In some other implementation, and as described above, location information repository 410 may receive information for multiple locations (e.g., location information for multiple restaurant locations serving pizza in Walnut Creek, Calif.). In this instance, location information repository 410 may store information, associated with the location information of the multiple locations. In one implementation, location information repository 410 may receive information for multiple locations from user device 210, map server 230, and/or any other device.

Web address generation module 420 may generate a web address associated with location information stored by location information repository 410. The generated web address may include a string of characters that identifies location information stored in location information repository 410. For example, the web address may be a string of characters, such as: "http://maps.verizon.com/479090dhh282789.ehshdh2/djssa-1405_Mill Valley_CA__ 94941."

Custom address module 430 may receive and/or store information identifying a custom address. For example, module 430 may receive and/or store a custom address based on user input. Additionally, or alternatively, module 430 may notify the user that the inputted custom address is unavailable (e.g., if the inputted address has already been used), and present custom address suggestions to the user. These custom address suggestions may be based on the custom address specified by the user and/or on information associated with the location. Additionally, or alternatively, the user may provide another custom address.

In some implementations, module 430 may automatically determine a custom address. For example, module 430 may automatically generate a custom address from received location information. In one example implementation, module 430 may receive location information from map server 230, such as information associated with landmarks and/or points of interest ("POIs"). Module 430 may automatically determine the custom address associated with the location information, based on the location information received from map server 230. For example, assume that module 430 receives and/or stores information about a geographic landmark (e.g. the Golden Gate Bridge) from map server 230. Module 430 may identify location information, such as the location name (e.g., Golden Gate Bridge), physical address, longitude and latitude coordinates, historical information, images, videos, and/or other information associated with the location. Module 430 may automatically determine a custom address (e.g., "http://address.of/goldengatebridge.com") associated with the information for the location (i.e., the Golden Gate Bridge), based on information received from map server 230. For example, module 430 may determine a custom address which may be descriptive of the location information and may be less cumbersome than the actual web address.

In some implementations, module 430 may generate a custom address with instructions embedded within the custom address. For example, the embedded instructions may cause user device 210 to automatically open mapping software, and/or some other software.

Custom address repository 440 may receive and/or store information for the custom addresses generated by module 430. For example, custom address repository 440 may receive and/or store custom address information, including the association between the custom address and the web address. Continuing with the above example, custom address repository 440 may store information associating the custom address "http://address.of/goldengatebridge.com" with the web address "http://maps.verizon.com/479090dhh282789.ehshdh2/djssa-1405_Mill Valley_CA__ 94941." Additionally, custom address repository 440 may store location information associated with the custom address (e.g., location name, location address, longitude and latitude coordinates, custom information, and/or custom instructions). Some examples of information that may be stored by custom address repository 440 are described further with respect to FIG. 5.

Custom address execution engine module 450 may provide custom address information to a web page. For example, module 450 may receive custom address information from custom address repository 440, and send the custom address information to a web page dedicated to publishing custom addresses. The custom addresses may be published in the form of links with location descriptions associated with the links to allow a user to identify a custom address associated with location information. In some implementations, the user may use user device 210 to select a custom address from the web page to obtain location information associated with the custom address. Additionally, or alternatively, module 450 may provide custom address information to user device 210 via SMS text, e-mail, or some other technique.

Additionally, or alternatively, module 450 may provide location information to user device 210 based on determining that user device 210 has selected a custom address. For example, module 450 may determine that user device 210 has selected a custom address based on a query from user device 210 for location information associated with the selected custom address. Based on the determining of the selection of the custom address, module 450 may identify location information associated with the custom address. Module 450 may output the identified location information to user device 210. In one implementation, when outputting the identified location information, module 450 may generate a map page based on the location information, and output the map page to user device 210. Additionally, or alternatively when outputting the location information, module 450 may cause user device 210 to automatically open mapping software and/or some other software to present the location information via a UI within the mapping software and/or some other software. An example of the presentation of module 450 is described above with respect to FIG. 1B.

For example, as shown in FIG. 1B, the output of module 450 may include a map page with a map of a location (e.g., Golden Gate Bridge), as well as directions to the location from another location. The map page may also include custom information defined by a user (e.g., the narrative "Lisa's Custom Details: Great place to job or bike ride!!").

Returning to FIG. 4, module 450 may additionally, or alternatively, execute and/or output custom instructions (e.g., display map of location, etc), associated with the custom address, based on the determining that user device 210 has selected a custom address. As described above with respect to custom information repository 410, the custom instructions may allow the user to define what location information is presented, and/or how location information is presented, on a user device, based on the user device selecting the custom address. For example, the custom instructions may include instructions that cause user device 210 to display location information associated with the custom address (e.g., a map of the location, custom information, comments, images, videos, and/or directions based on a current location of user device 210) via a map page and/or mapping software.

Additionally, or alternatively, the custom instructions may include a rule and/or algorithm to define what information is received by user device 210. In one example implementation, the rule and/or algorithm may include instructions for module 450 to output directions, if user device 210 is within a threshold distance of a location. For example, module 450 may output directions if user device 210 is within 50 kilometers of the location.

In some implementations, the rule and/or algorithm may include instructions for module 450 to output location information based on an authentication level of user device 210. For example, for some authentication levels, module 450 may output some location information, but not all location information. In one implementation, module 450 may output a street address for authorized users, but may only output the name of the town for other users.

It will be apparent that the above illustrates some specific examples for executing custom instructions based on a theoretically unlimited number of rules and/or algorithms. In practice, the user may define any number of rules and/or algorithms which module 450 may use to identify and execute custom instructions. Additionally, or alternatively, module 450 may identify and execute custom instructions based on some other technique.

Additionally, or alternatively, module 450 may execute instructions received from user device 210. For example, assume that the user, associated with user device 210, wishes to obtain additional information, associated with the location. In this case, the user may cause user device 210 to issue instructions to module 450 to output the additional location information to user device 210. Based on receiving instructions from user device 210, module 450 may output additional location information to user device 210, such as traffic information, historical information, directions, images, videos, and/or some other location information specified by the user.

FIG. 5 illustrates an example data structure 500 that may be stored by a server, such as custom server 220. In one implementation, data structure 500 may be stored in a memory of custom server 220. In another implementation, data structure 500 may be stored in a memory separate from, but accessible by, custom server 220. Custom server 220 may store multiple data structures 500 associated with one or more locations. A particular instance of data structure 500, associated with one location, may contain different information and/or fields than another instance of data structure 500, associated with another location. Custom server 220 may permit a user, associated with user device 210, and/or map server 230 to modify and/or control what information and/or fields are stored in data structure 500.

In some implementations, data structure 500 may correspond to custom address repository 440. As shown in FIG. 5, data structure 500 may include location name field 510, location address field 520, longitude/latitude field 530, custom information field 540, custom instructions field 550, web address field 560, and custom address field 570. In some implementations, data structure 500 may include additional fields, fewer fields, different fields, or differently arranged fields than are shown in FIG. 5.

Location name field 510 may store descriptive information that identifies one or more locations. In one implementation, a user may choose a character string, associated with location name field 510. Additionally, or alternatively, map server 230 may automatically provide a character string to store in location name field 510. In an example shown in FIG. 5, location name field 510 may store a character string associated with a single location such as, "Golden Gate Bridge," or "Eiffel Tower." In an example, as shown in FIG. 5, location name field 510 may store a character string associated with multiple locations, such as "Pizza places near Walnut Creek, Calif."

Location address field 520 may store information that identifies one or more street addresses associated with the location. In an example shown in FIG. 5, location address field 520 may store a street address, such as "1405 Golden Gate Bridge Mill Valley, Calif. 94941." In some implementations, location address field 520 may store multiple sets of street addresses associated with the location name. For example, as shown in FIG. 5, location address field may store multiple street addresses, each street address corresponding to a location associated with the location name "Pizza places near Walnut Creek, Calif."

Longitude/latitude field 530 may store information that identifies longitude and latitude coordinates associated with the location. In the example shown in FIG. 5, longitude/latitude field 530 may store the coordinates "37.82065, −122.478526." In some implementations, longitude/latitude field 530 may store multiple sets of longitude and latitude coordinates associated with the location name. For example, as shown in FIG. 5, longitude/latitude field 530 may store multiple sets of longitude and latitude coordinates, each set of longitude and latitude coordinates corresponding to a location associated the location name "Pizza places near Walnut Creek, Calif." In some implementations, custom server 220 may receive longitude and latitude coordinates from map server 230, user device 210, and/or some other device.

Custom information field 540 may store custom information associated with the location. The custom information may include text, a computer file (e.g., an image, video, text, or some other file), a link, and/or any other information. In the example shown in FIG. 5, custom information field 540 may store the character string "Lisa's Custom Details: Great place to jog or bike ride!!" in association with the "Golden Gate Bridge" location. As also shown in FIG. 5, custom information field 540 may store content of and/or a link to an image file in association with the "Eiffel Tower" location. As further shown in FIG. 5, custom information field 540 may store multiple sets of text, each set of text corresponding to a single location in associated with the location entry "Pizza places near Walnut Creek, Calif."

Custom instructions field 550 may store custom instructions associated with a location. For example, as discussed above with respect to module 450, custom instructions may include instructions that cause user device 210 to display information associated with the location, custom information, comments, images, videos, directions based on a current location of user device 210, and/or any other information associated with the location. For example, as shown in FIG. 5, custom instructions include instructions that cause user device 210 to display directions based on current location and to display custom information for the "Golden Gate Bridge" location. As also shown in FIG. 5, the custom instructions may include instructions that cause user device 210 to automatically open mapping software and display custom information and directions within the mapping software. Some examples of custom instructions are described above with respect to module 450.

Web address field 560 may store information identifying a web address associated with the location information. For example, as discussed above with respect to module 420, the web address may be a string of characters, such as a URL, that identifies location information stored in location information repository 410. As shown in FIG. 5, the web address may be a string of characters, such as: "http://maps.verizon.com/479090dhh282789.ehshdh2/djssa-1405_Mill Valley_CA_94941."

Custom address field 570 may store a custom address. For example, as discussed above with respect to module 430, custom address field 570 may store custom address information, based on the custom address request information from location information repository 410. For example, as shown in FIG. 5, custom address field 570 may store a URL, such as "http://address.of/goldengatebridge.com."

In some implementations, as discussed above with respect to module 450, information stored in location name field 510, location address field 520, longitude/latitude field 530, custom information field 540, custom instructions field 550, web address field 560, and custom address field 570 may be used to output location information to user device 210.

While data structure 500 is represented in FIG. 5 as a table with rows and columns, in practice, data structure 500 may include any type of data structure, such as a linked list, a tree, a hash table, a database, or any other type of data structure. Data structure 500 may include information generated by user device 210, and/or map server 230. Additionally, or alternatively, data structure 500 may include information provided from any other source, such as information provided by one or more users, and/or information automatically provided by one or more other devices in environment 200.

Figure 6:
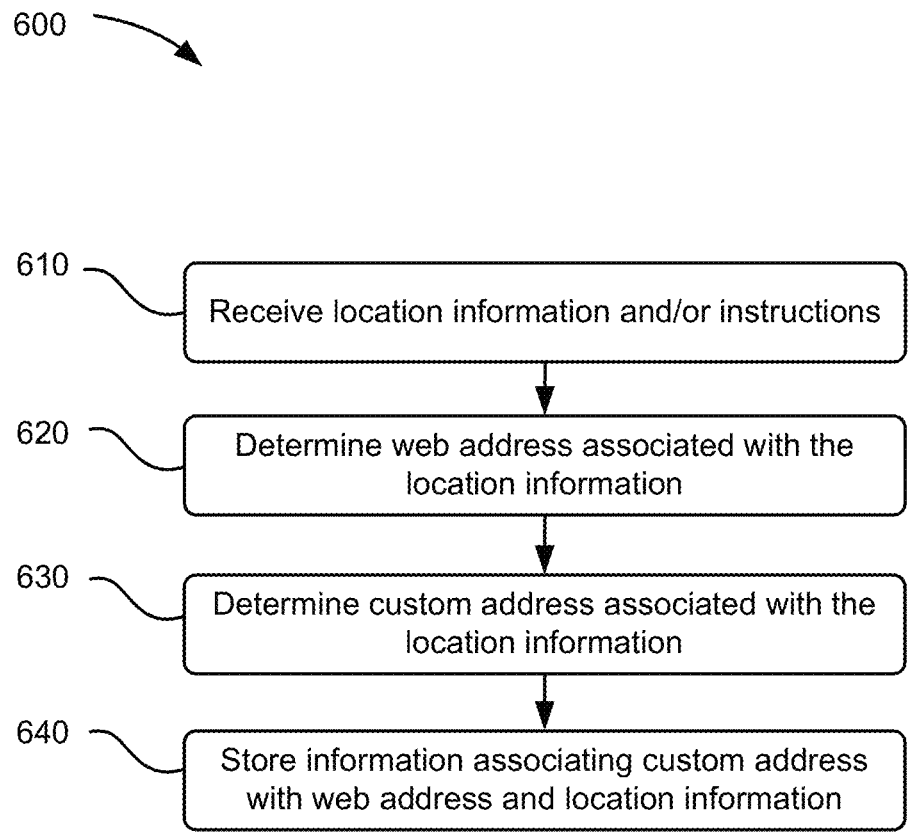
FIG. 6 illustrates a flowchart of an example process for storing information associating a custom address with a location.

FIG. 6 illustrates a flowchart of an example process 600 for storing information associating a custom address with a location. In one implementation, process 600 may be performed by one or more components of custom server 220, such as processing unit 305 of custom server 220. In one implementation, one or more blocks of process 600 may be performed by one or more components of another device (e.g., one or more of user devices 210 and/or map server 230), or any group of devices including or excluding custom server 220.

As shown in FIG. 6, process 600 may include receiving location information and/or instructions (block 610). For example, as described above with respect to location information repository 410, custom server 220 may receive location information and/or instructions from user device 210 (as shown in FIG. 1A) and/or from map server 230. Some examples of such location information are described above with respect to location information repository 410. For example, custom server 220 may receive location information, such as location name, location address, longitude and latitude coordinates, custom information, custom instructions, and/or custom addresses.

Process 600 may further include determining a web address associated with the location information (block 620). For example, as described above with respect to module 420, custom server 220 may assign a web address associated with the location information. Some examples of web addresses, associated with location information, are described above with respect to module 420 and FIG. 5. For example, assume that the location information is associated with the Golden Gate Bridge. The generated web address may be "http://maps.verizon.com/479090dhh282789.ehshdh2/djssa-1405_Mill Valley_CA_94941."

Process 600 may further include determining a custom address associated with the web address and the location information (block 630). For example, as described above with respect to module 430, custom server 220 may determine a custom address associated with the web address. In one implementation, user device 210 may provide the custom address. In some other implementation, custom server 220 may automatically determine a custom address, descriptive of the location, based on location information. Some examples of custom addresses, associated with location information, are described above with respect to module 430, FIGS. 1A and 1B. Continuing with the above example, the custom address may be "http://address.of/goldengatebridge.com."

Process 600 may further include storing information associating the custom address with the web address and the location information (block 640). For example, as described above with respect to custom address repository 440, custom server 220 may store information associating the custom address with the web address and the location information. Some examples of information associating the custom address with the web address and the location information are described above with respect to data structure 500.

Figure 7:
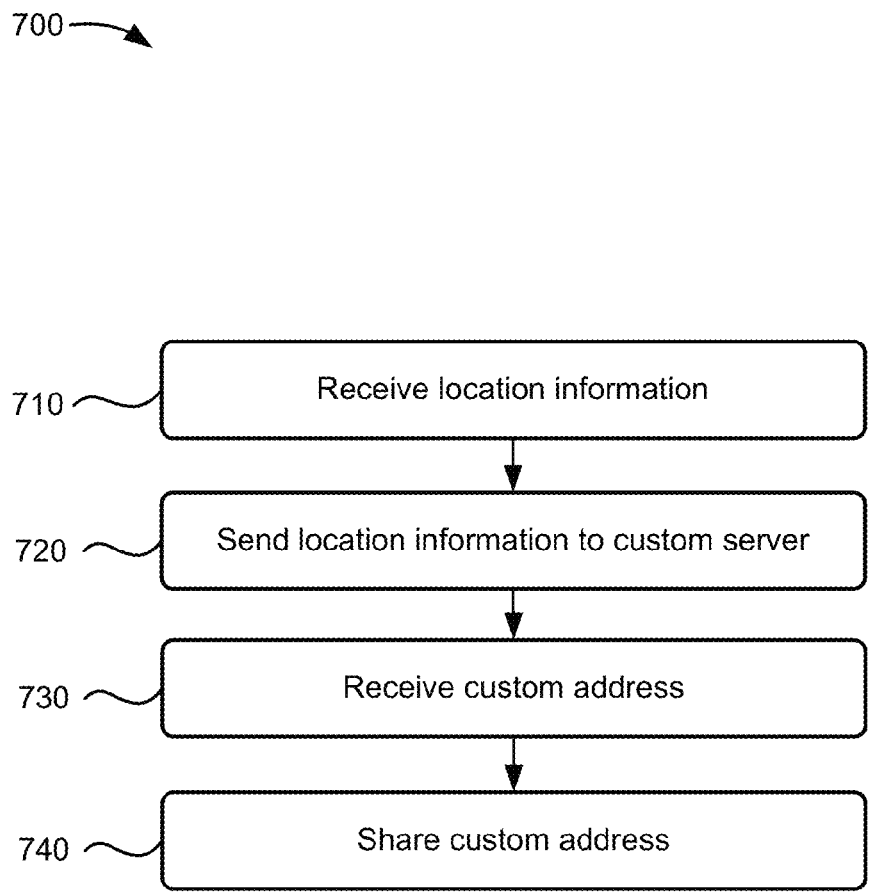
FIG. 7 illustrates a flowchart of an example process for receiving and sharing location information associated with a custom address.

FIG. 7 illustrates a flowchart of an example process 700 for receiving and sharing location information associated with a custom address. In one implementation, process 700 may be performed by one or more components of user device 210, such as processing unit 305 of user device 210. In one implementation, one or more blocks of process 700 may be performed by one or more components of another device (e.g., one or more of devices 210 and/or 230), or a group of devices including or excluding user device 210.

Process 700 may include receiving location information (block 710). In one implementation, user device 210 may receive location information via user input. Some examples of receiving location information are discussed above with respect to FIGS. 1A-1B, module 410, and FIG. 5. For example, location information may include a custom address request.

Process 700 may further include sending location information to custom server 220 (block 720). For example, as described above with respect to module 410, user device 210 may send location information, such as location names, location addresses, longitude and latitude coordinates, custom information (e.g., custom narratives, reviews, reports, images, videos, and/or other content), custom instructions, custom addresses, and/or any other information to custom server 220. Custom server 230 may determine a custom address based on the location information received from user device 210.

Process 700 may further include receiving a custom address (block 730). For example, user device 210 may receive a custom address, associated with the location information, from custom server 220. As previously discussed with respect to module 430, user device 210 may receive a custom address based on user input. Additionally, or alternatively, user device 210 may receive an automatically generated custom address descriptive of the location information. Continuing with the above example, the custom address may be a string of characters such as "http://address.of/goldengatebridge.com." Some additional examples of receiving custom addresses are discussed above with respect to FIGS. 1A and 1B, module 430, and data structure 500.

Process 700 may further include sharing the custom address (block 740). For example, user device 210 may share the custom address via e-mail, SMS text, social networking websites, or some other technique. In one example implementation, a user may include the custom address in an SMS message and transmit the SMS message to another user.

Figure 8:
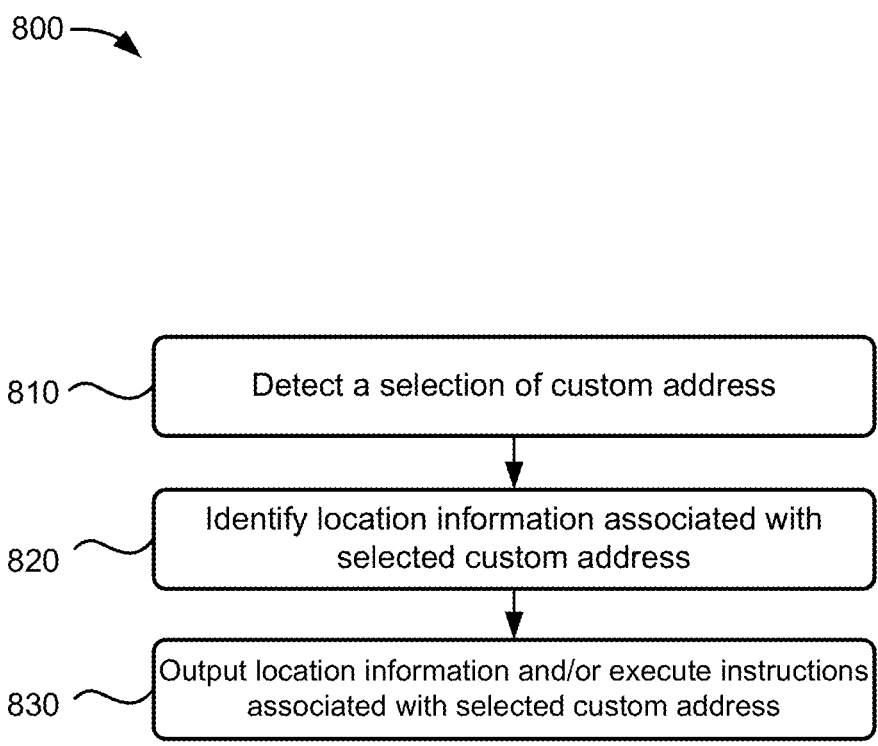
FIG. 8 illustrates a flowchart of an example process for outputting location information associated with a custom address.

FIG. 8 is a flowchart of an example process 800 for outputting location information associated with a custom address. In one implementation, process 800 may be performed by one or more components of custom server 220, such as processing unit 305 of custom server 220. In one implementation, one or more blocks of process 800 may be performed by one or more components of another device (e.g., one or more of user devices 210 and/or custom server 230), or a group of devices including or excluding custom server 220. Process 800 may correspond to user device 210 receiving a custom address via any of the techniques described above (e.g., via a dedicated web page with custom address information, via e-mail, via SMS text, etc). Process 800 may correspond to a user using user device 210 to select a custom address in order to receive location information associated with the custom address. Additionally, or alternatively, process 800 may correspond to user device 210 automatically selecting a custom address, based on embedded instructions within the custom address.

Process 800 may include detecting a selection of a custom address (block 810). For example, custom server 220 may detect a selection of a custom address in the form of a query from user device 210 for location information associated with the custom address. In one implementation, custom server 220 may detect the selection of the custom address "http://address.of/goldengatebridge.com."

Process 800 may further include identifying location information associated with the selected custom address (block 820). For example, as described above with respect to module 450 and data structure 500, custom server 220 may identify the location information associated with the selected custom address. In one implementation, custom server 220 may use data structure 500 to identify the location information associated with the selected custom address. For example, custom server 220 may use the selected custom address to search for a matching entry within custom address field 570 of data structure 500. Custom server 220 may identify a matching entry of the selected custom address, and may identify location information associated with the matched entry of the selected custom address.

Process 800 may include outputting location information associated with the selected custom address (block 830). For example, custom server 220 may output location information associated with the selected custom address, as described above with respect to module 450. In one implementation, custom server 220 may output the location information in the form of a map page. In another implementation, custom server 220 may output the location information in a manner that may allow user device 210 to present the location information in the form of a UI within mapping software and/or some other software. Some examples for outputting location information associated with the custom address are described above with respect to module 450.

Some examples of process 800 are described above with respect to FIG. 1B and data structure 500. For example, referring back to FIG. 1B, custom server 220 may identify the selection of the custom address "http://address.of/goldengatebridge.com." Custom server 220 may use data structure 500 to identify information associated with the custom address. Custom server 220 may also execute the instructions associated with the custom address. In the example of FIG. 1B, custom server 220 may send instructions to user device 210 to present a map with a location (e.g., Golden Gate Bridge), to present custom information (e.g., the character string "Lisa's Custom information: Great place to jog or bike ride!!"), and to present directions to the location from a current location associated with user device 210.

Figure 9A:
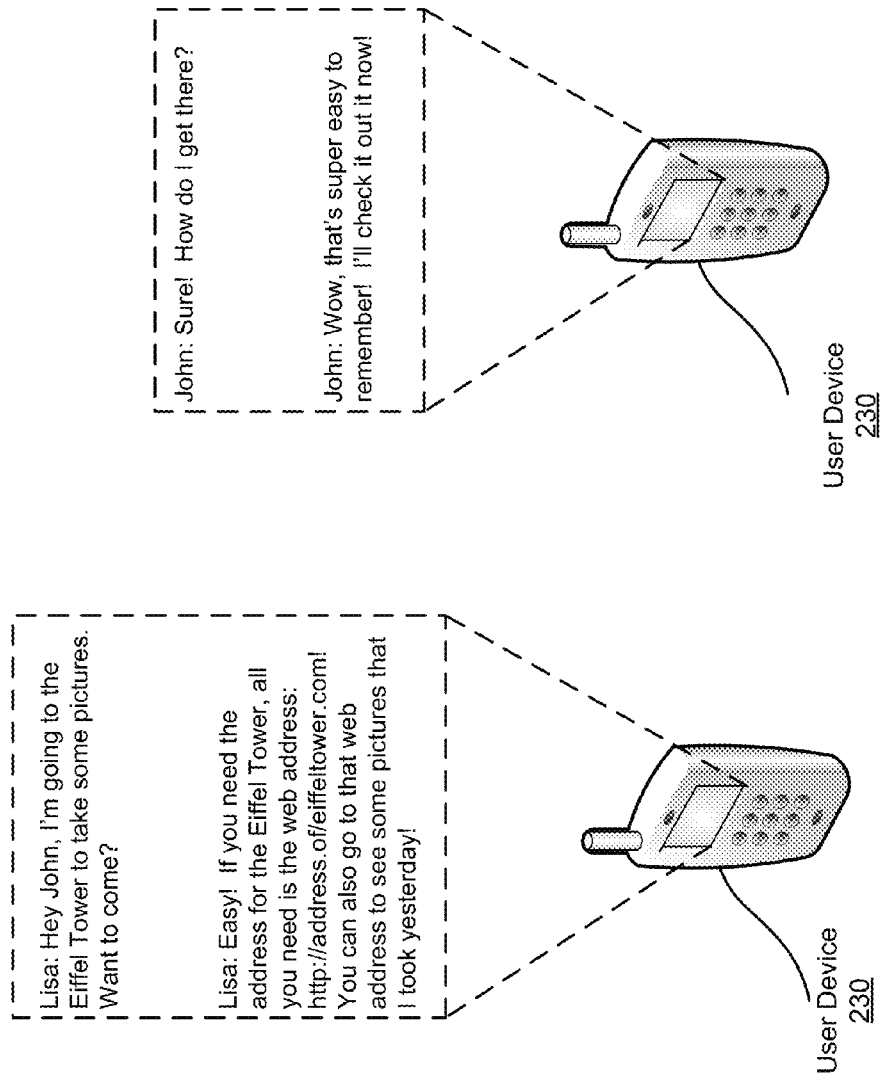
FIGS. 9A, 9B, and 10 illustrate example implementations described herein.
Figure 9B:
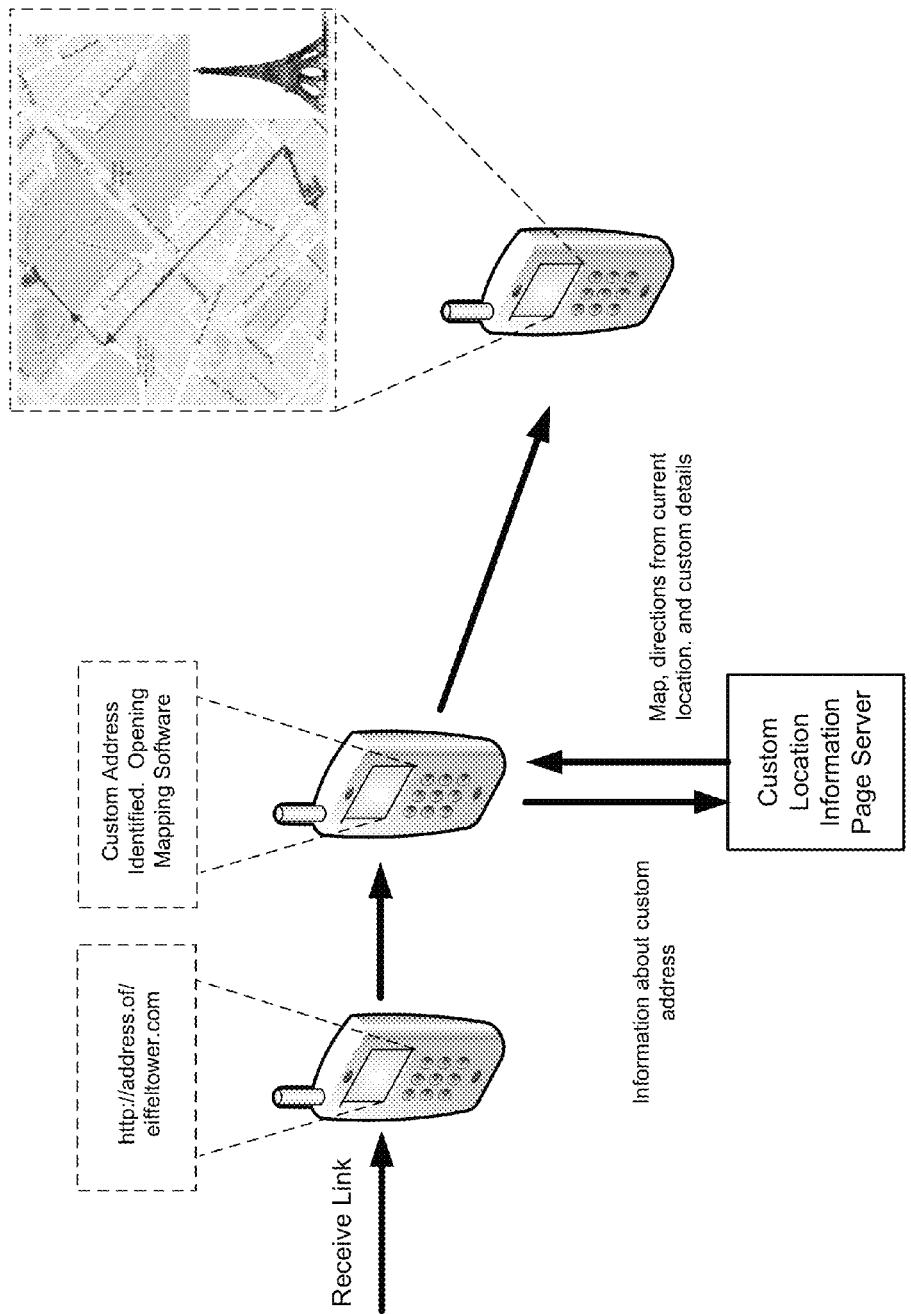

FIGS. 9A-9B illustrate an example implementation described herein. As shown in FIG. 9A, assume that two users (e.g., "Lisa" and "John") are exchanging correspondence via SMS. Lisa may extend an invitation to John for him to join Lisa in her visit to a location (e.g., the Eiffel Tower). John may accept the invitation and inquire for directions to the location (i.e., the Eiffel Tower). Lisa may provide John with a custom address (e.g., "http://address.of/eiffeltower.com") which may be associated with location information including directions to the location (i.e., the Eiffel Tower).

As shown in FIG. 9B, assume the user (i.e., "John"), associated with a user device 210, receives the custom address "http://address.of/eiffeltower.com" via SMS as described above with respect to FIG. 9A. Similar to the example described above with respect to FIG. 1B, the user may instruct user device 210 to select the custom address.

Based on detecting the selection of the custom address, user device 210 may query custom server 220 for location information, associated with custom address. Based on receiving the location information from custom server 220, user device 210 may present some or all of the location information. For example, user device 210 may present a map of a location, directions to the location from the current location of the user device 210, and custom information in the form of an image. User device 210 may present the location information within a standard web browser, in specialized mapping software, and/or using some other software.

Figure 10:
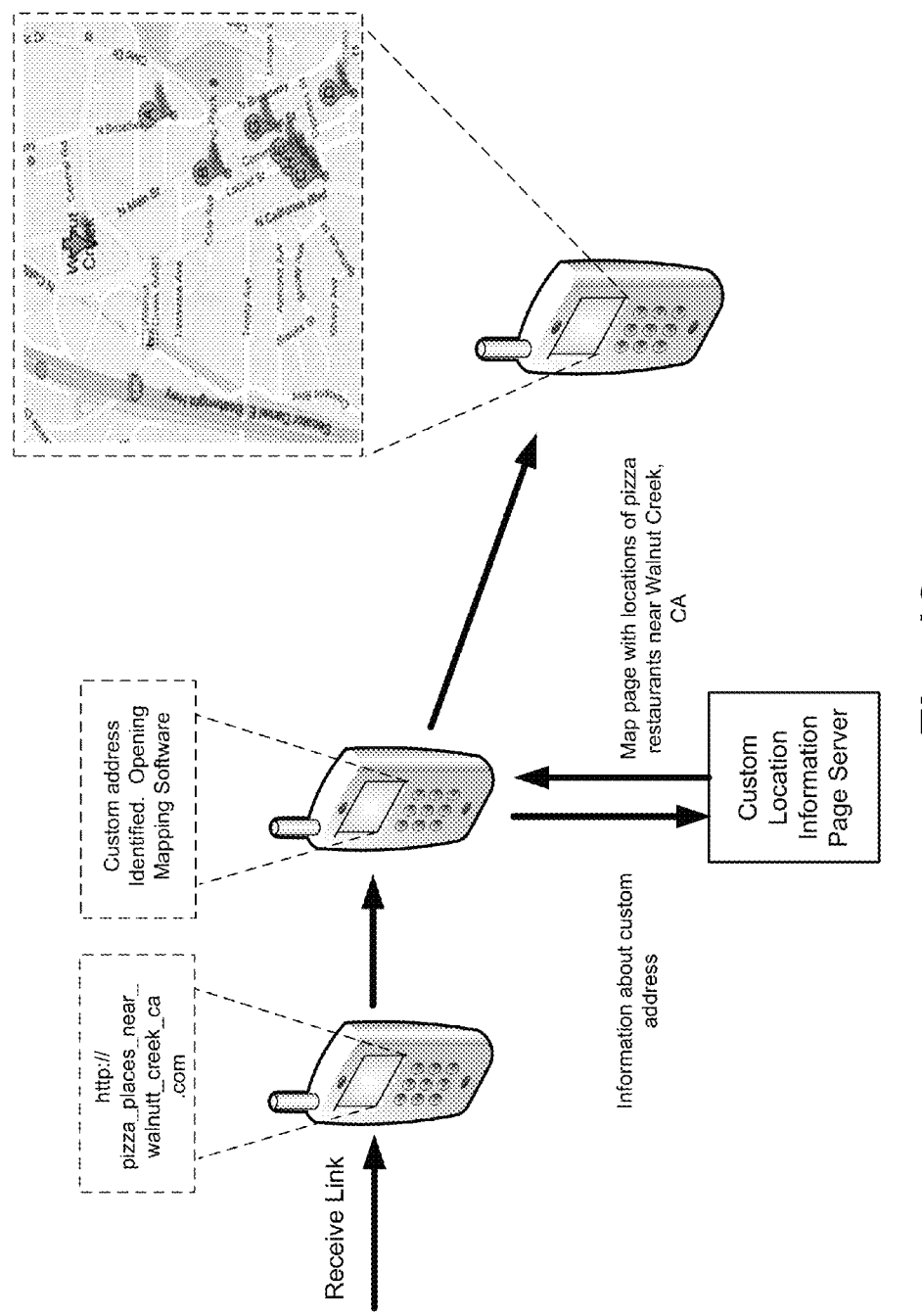

FIG. 10 is a diagram of an example implementation described herein. As shown in FIG. 10, assume that a user, associated with a user device 210, receives the custom address "http://pizza_places_near/walnutt_creek_ca.com." In this example, however, user device 210 may automatically select the custom address.

Based on detecting the selection of the custom address, user device 210 may further detect that the custom address includes embedded instructions to automatically open mapping software and/or some other software. For example, the embedded instructions may be in the form of an identifier in the custom address itself (e.g. the character string "address.of." may correspond to an identifier within the custom address). Additionally, or alternatively, the embedded instructions may exist in some other form. Based on detecting the custom address, user device 210 may query custom server 210 for location information, associated with the custom address. Based on receiving the location information from custom server 220, user device 210 may present location information of multiple locations (e.g. locations of several pizza restaurants near Walnut Creek, Calif.), such as a map of the multiple locations. User device 210 may present the location information in the mapping software, and/or using some other software.

FIGS. 9A-10 illustrate some examples for simplifying the process of identifying and/or sharing location information, based on a theoretically unlimited number of possible inputs, with respect to location information. In practice, a user may define any number of inputs to identify and/or share location information including, or in addition to, the inputs described above.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 6-8, the order of the blocks may be modified in other implementations. Further, non-dependent blocks may be performed in parallel.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by one or more devices, location information associated with a geographic location;
   determining, by the one or more devices, a web address associated with the location information;
   receiving, by the one or more devices and from a user device, a custom address that includes one or more instructions associated with providing the location information for display via the user device,
       the custom address being descriptive of the geographic location, and
       the custom address being different from the web address;
   storing, by the one or more devices, information associating the web address, the custom address, and the location information; and
   sending, by the one or more devices, the custom address to the user device,
       the custom address enabling the user device to obtain at least a portion of the location information at the web address.

2. The method of claim 1, further comprising:
   detecting a selection of the custom address;
   identifying the location information, based on the web address and detecting the selection of the custom address; and
   outputting the location information to the user device.

3. The method of claim 2, where detecting the selection of the custom address includes:
   receiving a query from the user device for the location information.

4. The method of claim 1, further comprising:
   receiving, from the user device, the one or more instructions;
   detecting a selection of the custom address;
   identifying the location information based on the web address and detecting the selection of the custom address; and
   executing the one or more instructions;
       where the one or more instructions cause the location information to be output in accordance with a rule set by a user associated with the user device.

5. The method of claim 1, further comprising:
   embedding the one or more instructions within the custom address;
       the one or more instructions causing the user device to execute mapping software to present the location information.

6. The method of claim 1, where receiving the custom address includes:
   receiving information identifying the custom address from the user device, and generating the custom address based on the information identifying the custom address.

7. The method of claim 6, where generating the custom address includes:
automatically generating the custom address based on the location information.

8. A system comprising:
one more processors to:
receive location information associated with a geographic location;
generate a page based on the location information;
generate a web address associated with the page;
receive, from a user device, a custom address associated with the web address;
the custom address including one or more instructions associated with providing the location information for display via the user device,
the custom address being descriptive of the geographic location, and
the custom address being different than the web address;
store information associating the web address, the custom address, and the location information; and
send the custom address to the user device,
the custom address enabling the user device to obtain at least a portion of the location information via the page based on the web address.

9. The system of claim 8, where the one or more processors are further to:
detect a selection of the custom address;
identify the location information based on the web address and detecting the selection of the custom address; and
output the location information to the user device.

10. The system of claim 9, where, when detecting the selection of the custom address, the one or more processors are to:
receive a query from the user device for the location information, and
detect the selection of the custom address based on receiving the query.

11. The system of claim 8, where the one or more processors are further to:
receive, from the user device, the one or more instructions;
detect a selection of the custom address;
identify the location information based on the web address; and
execute the one or more instructions included in the custom address based on detecting the selection of the custom address;
where the one or more instructions cause the location information to be output in accordance with a rule set by a user associated with the user device.

12. The system of claim 8, where the one or more processors are further to:
embed the one or more instructions within the custom address,
the one or more instructions causing the user device to open a mapping application,
the location information being provided for display via the mapping application.

13. The system of claim 8, where, when receiving the custom address, the one or more processors are to:
receive information identifying the custom address from the user device, and
generate the custom address based on the information identifying the custom address.

14. The system of claim 13, where, when generating the custom address, the one or more processors are to:
automatically generate the custom address based on the location information.

15. A non-transitory computer-readable medium storing instructions, the instructions comprising:
one or more instructions which, when executed by one or more processors, cause the one or more processors to:
receive location information associated with a geographic location;
receive, from a user device, a custom address associated with the location information,
the custom address including a group of instructions for providing the location information for display via the user device, and
the custom address being descriptive of the location information;
store information associating the custom address and the location information;
detect a selection of the custom address;
identify the location information based on the selection of the custom address; and
output the location information to the user device.

16. The non-transitory computer-readable medium of claim 15, where the one or more instructions to detect the selection of the custom address include:
one or more instructions which, when executed by the one or more processors, cause the one or more processors to:
receive a query, from the user device, for the location information, and
detect the selection of the custom address based on receiving the query.

17. The non-transitory computer-readable medium of claim 15, where the instructions further comprise:
one or more instructions which, when executed by the one or more processors, cause the one or more processors to:
receive, from the user device, the group of instructions;
identify the location information based on a web address associated with the custom address,
the web address being different from the custom address; and
execute the group of instructions;
where executing the group of instructions causes the location information to be output in accordance with a rule set by a user associated with the user device.

18. The non-transitory computer-readable medium of claim 15, where the instructions further comprise:
one or more instructions which, when executed by the one or more processors, cause the one or more processors to:
embed the group of instructions within the custom address,
the group of instructions causing the user device to open a mapping application, and
the location information being provided for display via the mapping application.

19. The non-transitory computer-readable medium of claim 15, where the one or more instructions to receive the custom address include:
one or more instructions which, when executed by the one or more processors, cause the one or more processors to:
receive information identifying the custom address from the user device, and
generate the custom address based on the information identifying the custom address.

20. The non-transitory computer-readable medium of claim 19, where the one or more instructions to generate the custom address include:
one or more instructions which, when executed by the one or more processors, cause the one or more processors to: automatically generate the custom address based on the location information.

\* \* \* \* \*